United States Patent
McRae, Jr. et al.

(10) Patent No.: US 6,923,616 B2
(45) Date of Patent: Aug. 2, 2005

(54) METHODS AND APPARATUS FOR COOLING GAS TURBINE ENGINE ROTOR ASSEMBLIES

(75) Inventors: Ronald Eugene McRae, Jr., Cincinnati, OH (US); Sean Robert Keith, Fairfield, OH (US); Gulcharan Singh Brainch, West Chester, OH (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 10/653,519

(22) Filed: Sep. 2, 2003

(65) Prior Publication Data

US 2005/0047906 A1 Mar. 3, 2005

(51) Int. Cl.⁷ .................................................. F01D 5/18
(52) U.S. Cl. ........................ 415/115; 415/116; 416/92; 416/96 R
(58) Field of Search ............................... 415/115, 116; 416/96 R, 97 R, 90 R, 92, 96 A

(56) References Cited

U.S. PATENT DOCUMENTS

| | | |
|---|---|---|
| 3,369,792 A | 2/1968 | Kraimer et al. |
| 4,236,870 A | 12/1980 | Hucul, Jr. et al. |
| 4,589,824 A | 5/1986 | Kozlin |
| 4,726,104 A | 2/1988 | Foster et al. |
| 5,215,431 A | 6/1993 | Derrien |
| 5,261,789 A | 11/1993 | Butts et al. |
| 5,342,172 A | 8/1994 | Coudray et al. |
| 5,503,527 A | 4/1996 | Lee et al. |
| 5,503,529 A | 4/1996 | Anselmi et al. |
| 5,669,759 A | 9/1997 | Beabout |
| 5,772,397 A | 6/1998 | Morris et al. |
| 5,772,398 A | 6/1998 | Noiret et al. |
| 6,164,914 A | 12/2000 | Correia et al. |
| 6,174,135 B1 | 1/2001 | Lee |
| 6,179,556 B1 | 1/2001 | Bunker |
| 6,299,412 B1 | 10/2001 | Wood et al. |
| 6,341,939 B1 * | 1/2002 | Lee ........................... 416/97 R |
| 6,382,913 B1 | 5/2002 | Lee et al. |
| 6,416,284 B1 * | 7/2002 | Demers et al. ........... 216/97 R |
| 6,428,270 B1 * | 8/2002 | Leone et al. ................. 415/115 |

* cited by examiner

Primary Examiner—Edward K. Look
Assistant Examiner—Dwayne J. White
(74) Attorney, Agent, or Firm—Armstrong Teasdale LLP; William Scott Andes

(57) ABSTRACT

A method facilitates fabricating a rotor assembly for a gas turbine engine. The method comprises providing a plurality of rotor blades that each include an airfoil, a dovetail, a shank, and a platform, wherein the platform extends between the shank and the airfoil, and wherein the dovetail extends outwardly from the shank, and forming a cooling circuit within a portion of the shank to supply cooling air to the rotor blade for supplying cooling air to the rotor blade for impingement cooling a portion of the rotor blade and for supplying cooling air to the rotor blade for purging a cavity defined downstream from the rotor blade.

20 Claims, 4 Drawing Sheets

METHODS AND APPARATUS FOR COOLING GAS TURBINE ENGINE ROTOR ASSEMBLIES

BACKGROUND OF THE INVENTION

This application relates generally to gas turbine engines and, more particularly, to methods and apparatus for assembling gas turbine engine rotor assemblies.

At least some known gas turbine engines include a compressor for compressing air which is mixed with a fuel and channeled to a combustor wherein the mixture is ignited within a combustion chamber for generating hot combustion gases. The hot combustion gases are channeled downstream to a turbine, which extracts energy from the combustion gases for powering the compressor, as well as producing useful work to propel an aircraft in flight or to power a load, such as an electrical generator.

Known compressors include a rotor assembly that includes at least one row of circumferentially spaced rotor blades. Each rotor blade includes an airfoil that includes a pressure side, and a suction side connected together at leading and trailing edges. Each airfoil extends radially outward from a rotor blade platform. Each rotor blade also includes a dovetail that extends radially inward from a shank coupled to the platform. The dovetail is used to mount the rotor blade within the rotor assembly to a rotor disk or spool. Known shanks are hollow and include a convex sidewall and a concave sidewall.

During operation, because of continued exposure to high temperatures and stresses, at least some known rotor blades may be subjected to low cycle fatigue. More specifically, at least some known rotor blades may be susceptible to low cycle fatigue and/or creep along a pressure side of the platform and/or at the filet radius extending between the platform and the airfoil.

To facilitate reducing the effects of the high temperatures, at least some known rotor blades include a cooling opening formed within the shank. More specifically, within at least some known shanks the cooling opening extends through the concave sidewall for providing impingement cooling air to the platform. In other known shanks, the cooling opening extends through shank convex sidewall. However, within known rotor blades, such cooling openings may provide only limited cooling to the rotor blades.

BRIEF SUMMARY OF THE INVENTION

In one aspect, a method for fabricating a rotor assembly for a gas turbine engine is provided. The method comprises providing a plurality of rotor blades that each include an airfoil, a dovetail, a shank, and a platform, wherein the platform extends between the shank and the airfoil, and wherein the dovetail extends outwardly from the shank, and forming a cooling circuit within a portion of the shank to supply cooling air to the rotor blade for supplying cooling air to the rotor blade for impingement cooling a portion of the rotor blade and for channeling cooling air to the rotor blade for purging a cavity defined downstream from the rotor blade.

In another aspect, a rotor blade for a gas turbine engine is provided. The rotor blade includes a platform, an airfoil, a shank, a dovetail, and a cooling circuit. The airfoil extends radially outward from the platform, and the shank extends radially inward from the platform. The dovetail extends from the shank. The cooling circuit extends through a portion of the shank for supplying cooing air for impingement cooling at least a portion of the rotor blade and for channeling purge air downstream from the rotor blade into a cavity defined within the gas turbine engine.

In a further aspect, a gas turbine engine including a rotor assembly is provided. The rotor assembly includes a plurality of rotor blades coupled to a rotor disk. Each of the plurality of rotor blades includes an airfoil, a dovetail, a shank, and a platform. The platform extends between the shank and the airfoil. The dovetail extends outward from the shank. At least one of the plurality of rotor blades also includes a cooling circuit extending through the shank for supplying cooling air for impingement cooling a portion of the rotor blade and for supplying purge air downstream from the platform.

DETAILED DESCRIPTION OF THE INVENTION

Figure 1:
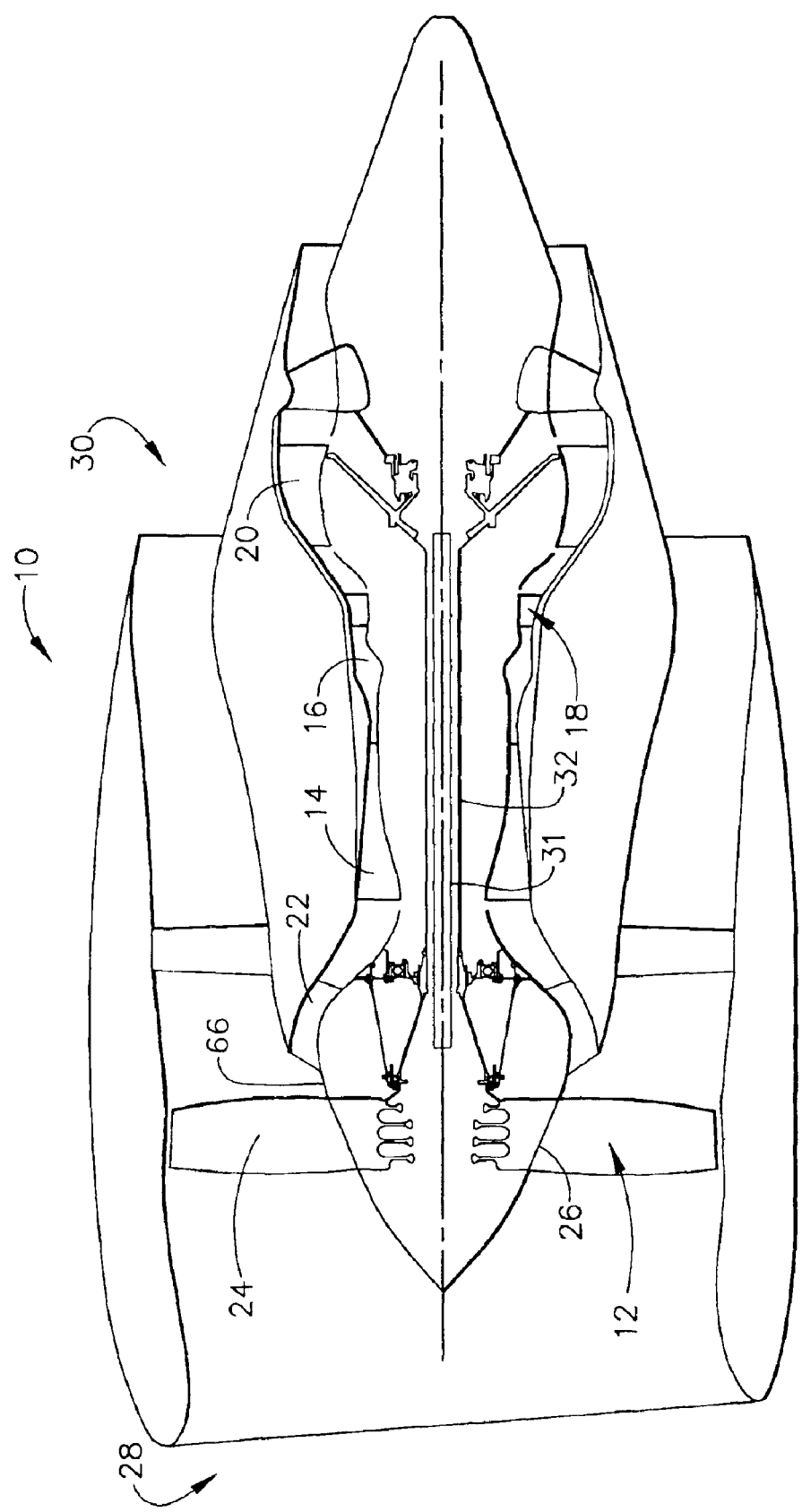
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. In an alternative embodiment, engine 10 includes a low pressure compressor. Fan assembly 12 and turbine 20 are coupled by a first rotor shaft 31, and compressor 14 and turbine 18 are coupled by a second rotor shaft 32.

In operation, air flows through fan assembly 12 and compressed air is supplied to high pressure compressor 14 through booster 22. The highly compressed air is delivered to combustor 16. Airflow (not shown in FIG. 1) from combustor 16 drives turbines 18 and 20, and turbine 20 drives fan assembly 12 by way of shaft 31.

Figure 2:
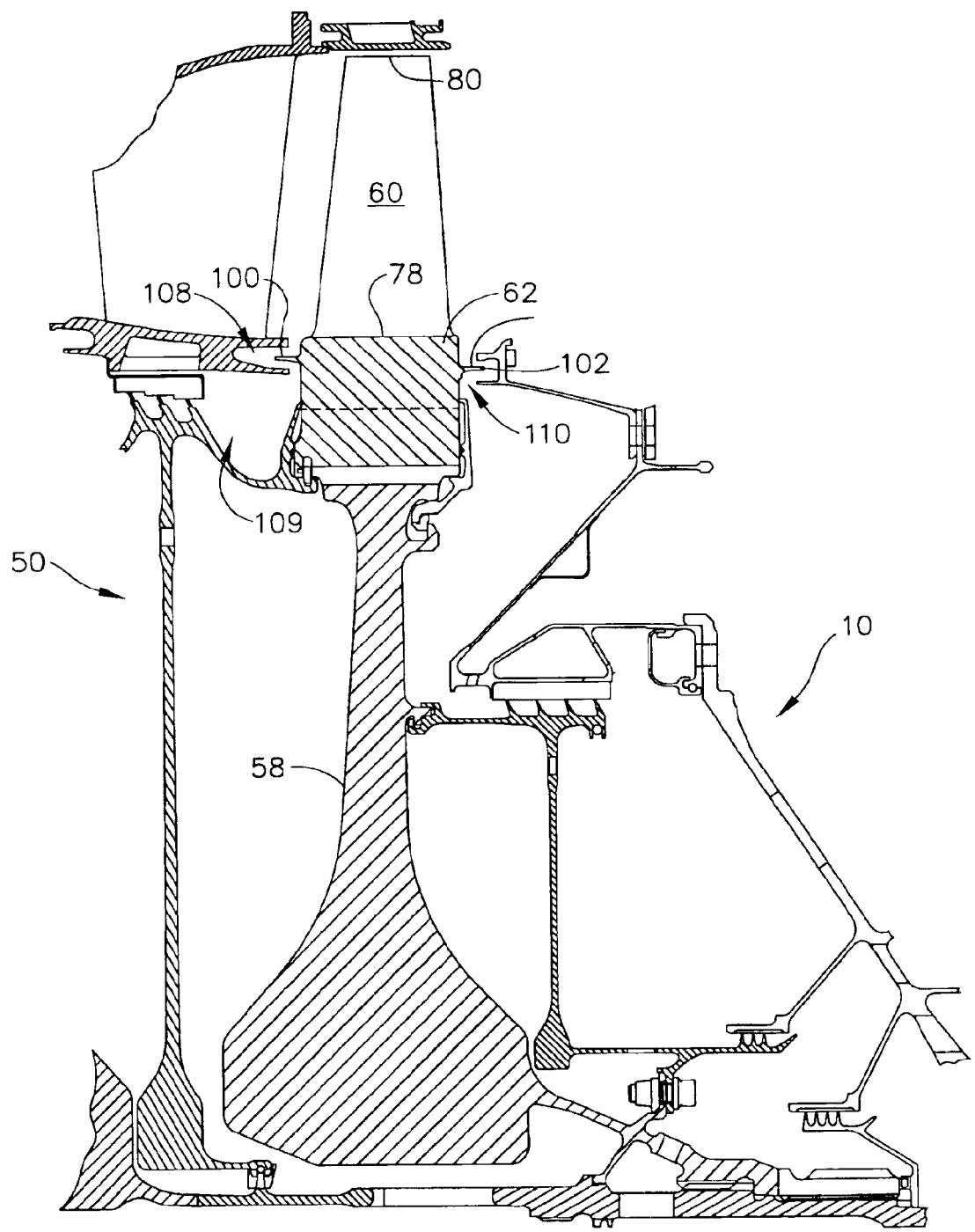
FIG. 2 is an enlarged cross-sectional view of a portion of an exemplary rotor assembly that may be used with the gas turbine engine shown in FIG. 1.
Figure 3:
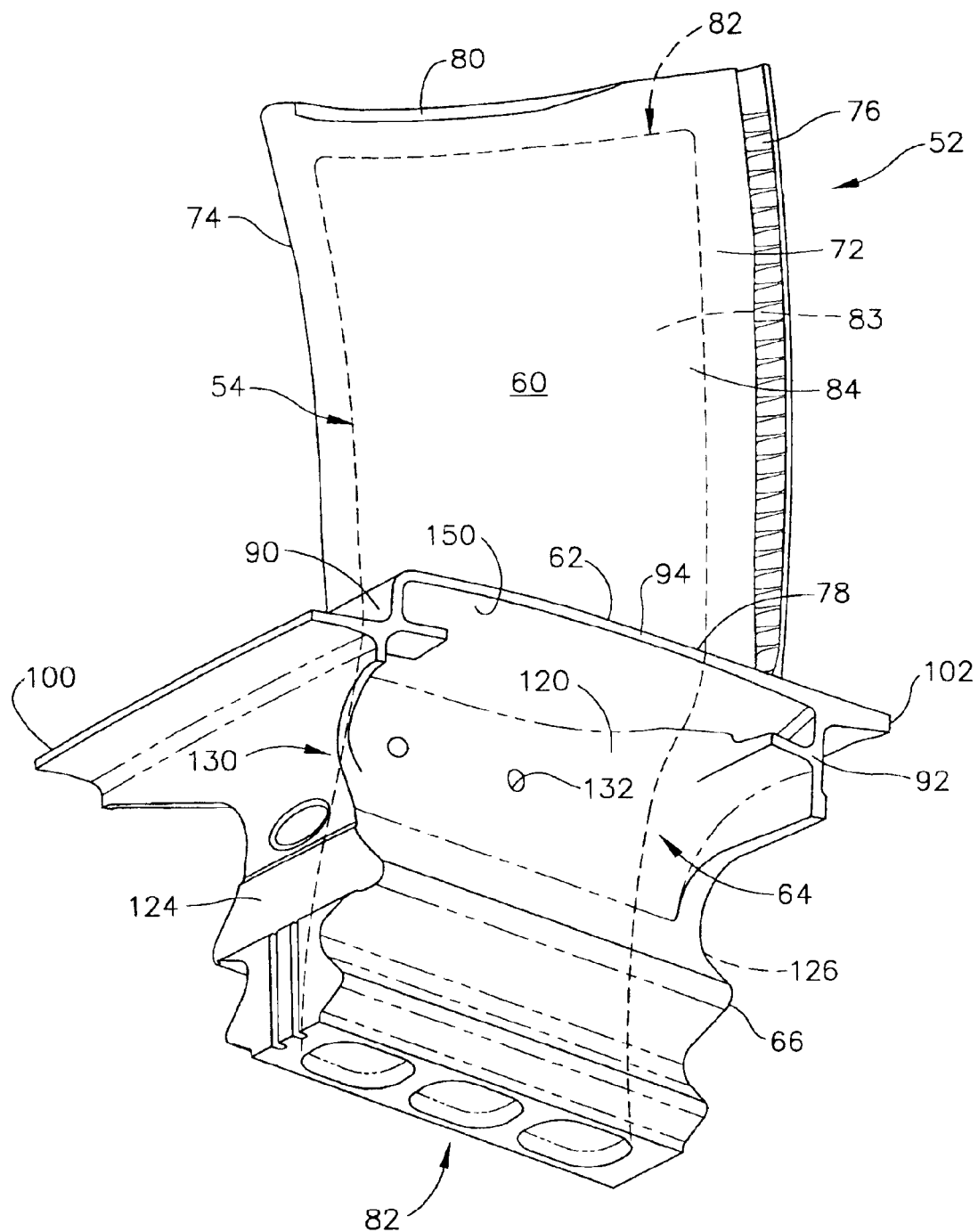
FIG. 3 is an enlarged perspective view of a portion of a rotor blade that may be used with the rotor assembly shown in FIG. 2 and viewed from a pressure side of the rotor blade.
Figure 4:
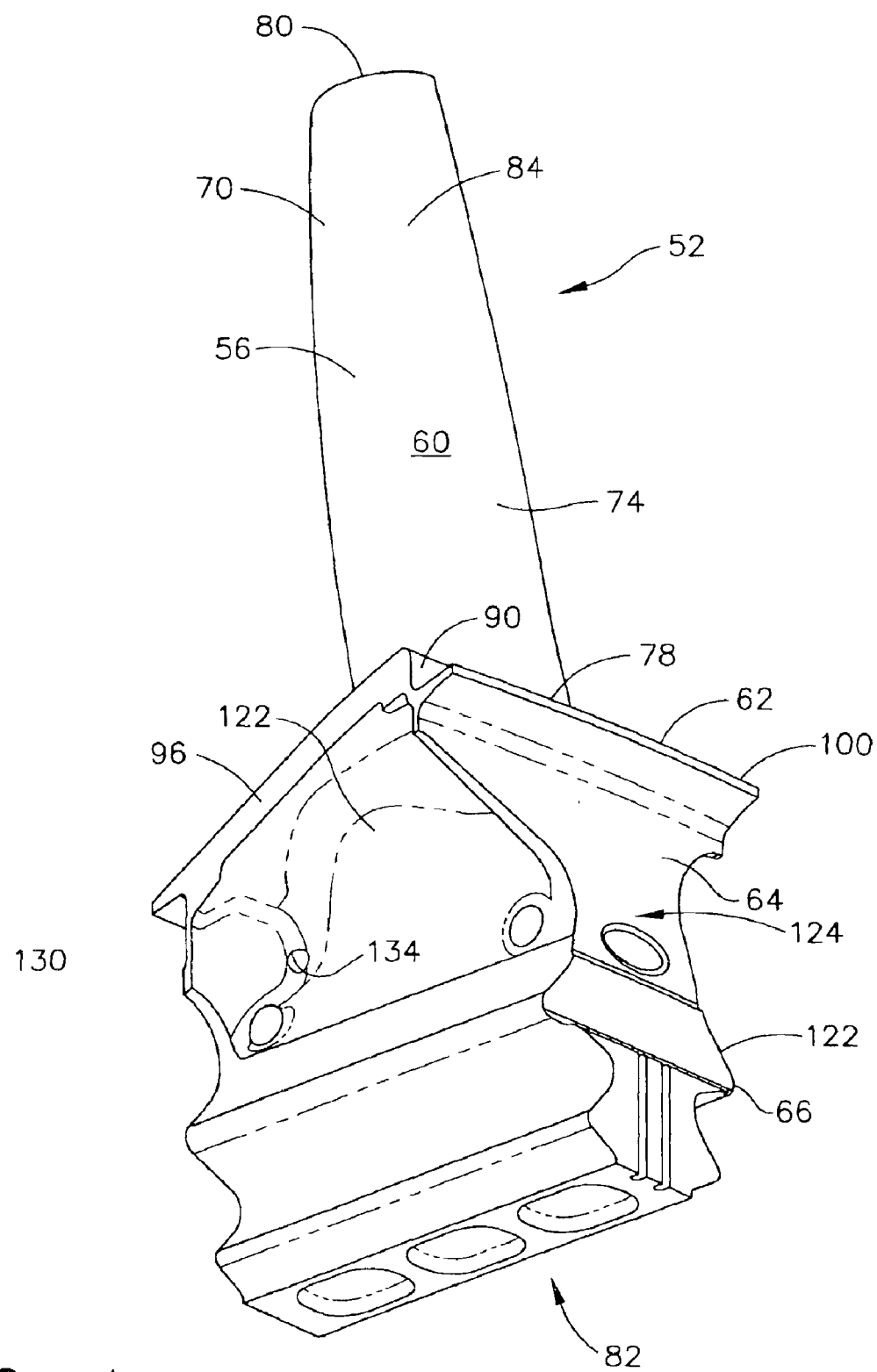
FIG. 4 is a perspective view of the rotor blade shown in FIG. 4 and viewed from a suction side of the rotor blade.

FIG. 2 is an enlarged cross-sectional view of a portion of an exemplary rotor assembly 50 that may be used with the gas turbine engine 10. FIG. 3 is an enlarged perspective view of a portion of an exemplary rotor blade 52 that may be used with rotor assembly 50 and viewed from a pressure side 54. FIG. 4 is a perspective view of rotor blade 52 viewed from a suction side 56 of rotor blade 52. Rotor blades 52 extend radially outward from rotor disk 58, and each includes an airfoil 60, a platform 62, a shank 64, and a dovetail 66. In an alternative embodiment, rotor blades 52 are mounted within a rotor spool (not shown).

Each airfoil 60 includes first sidewall 70 and a second sidewall 72. First sidewall 70 is convex and defines a suction side of airfoil 60, and second sidewall 72 is concave and defines a pressure side of airfoil 60. Sidewalls 70 and 72 are joined at a leading edge 74 and at an axially-spaced trailing edge 76 of airfoil 60. More specifically, airfoil trailing edge 76 is spaced chord-wise and downstream from airfoil leading edge 74.

First and second sidewalls 70 and 72, respectively, extend longitudinally or radially outward in span from a blade root 78 positioned adjacent platform 62, to an airfoil tip 80. Airfoil tip 80 defines a radially outer boundary of an internal cooling chamber 82. Cooling chamber 82 is bounded within airfoil 60 between sidewalls 70 and 72, and extends through platform 62 and through shank 64 and into dovetail 66. More specifically, airfoil 60 includes an inner surface 83 and an outer surface 84, and cooling chamber 82 is defined by airfoil inner surface 83.

Platform 62 extends between airfoil 60 and shank 64 such that each airfoil 60 extends radially outward from each respective platform 62. Shank 64 extends radially inwardly from platform 62 to dovetail 66. Dovetail 66 extends radially inwardly from shank 64 and facilitates securing rotor blade 52 to rotor disk 58.

Platform 62 includes an upstream side or skirt 90 and a downstream side or skirt 92 which are connected with a pressure-side edge 94 and an opposite suction-side edge 96. Platform 62 also includes a forward angel wing 100, and an aft angel wing 102 which each extend outwardly from respective skirts 90 and 92. Skirts 90 and 92 facilitate sealing forward and aft angel wing buffer cavities 108 and 110.

Shank 64 includes a substantially concave sidewall 120 and a substantially convex sidewall 122 connected together at an upstream sidewall 124 and a downstream sidewall 126 of rotor blade 52. A cooling circuit 130 is coupled to shank 64 to provide cooling air for cooling rotor blade 52, as described in more detail below. Specifically, cooling circuit 130 includes a first cooling opening 132 formed within shank concave sidewall 120 and a second cooling opening 134 formed within shank convex sidewall 122. More specifically, first cooling opening 132 extends through shank concave sidewall 120 and into flow communication with cooling chamber 82.

Cooling circuit second cooling opening 134 extends at least partially through shank convex sidewall 122 such that opening 134 extends between sidewall 122 and platform downstream skirt 92. Accordingly, a discharge side (not shown) of opening 134 is between platform 62 and dovetail 66, and more specifically, is between aft angel wing 102 and dovetail 66.

During engine operation, at least some cooling air supplied to blade 52 through dovetail 66 is discharged outwardly through concave opening 132. More specifically, opening 132 is oriented such that air discharged therethrough is directed towards platform 62 for impingement cooling of platform 62 along platform pressure-side edge 94. Specifically, air discharged from cooling opening 132 impinges upon an underside 150 of platform pressure-side edge 94. During engine operation, rotor blade pressure side 54 is generally exposed to higher temperatures than rotor blade suction side 56. During operation, cooling opening 132 facilitates reducing an operating temperature of platform 62.

Airflow discharged from opening 134 is also channeled from cooling opening 134 towards aft angel wing 102. More specifically, air discharged from cooling opening 134 facilitates purging aft angel wing buffer cavity 110. Maintaining adequate purging of cavity 110 facilitates reducing an operating temperature and an amount of creep of aft angel wing 102. The majority of airflow through opening 134 is airflow that had been discharged from opening 132. Without cooling opening 132, opening 134 would primarily only receive secondary airflow from forward wheel space cavity 109, and as such, cavity 108 would receive a reduced purge flow. Accordingly, the combination of concave shank cooling hole 132 and convex shank cooling hole 134 provide enough cooling air to cavity 110 such that flowpath ingestion that may occur within at least some known rotor blades is facilitated to be reduced.

The above-described rotor blade cooling circuit provides a cost-effective and highly reliable method for supplying cooling air to a pressure side of the platform, while also providing purge air to the aft angel wing buffer cavity. As such, an operating temperature of the pressure of the platform, and the aft angel wing are facilitated to be reduced. Accordingly, an amount of aft angel wing creep during engine operation is also facilitated to be reduced. As a result, the rotor blade cooling circuit facilitates extending a useful life of the rotor assembly and improving the operating efficiency of the gas turbine engine in a cost-effective and reliable manner.

Exemplary embodiments of rotor blades and rotor assemblies are described above in detail. The rotor assemblies are not limited to the specific embodiments described herein, but rather, components of each assembly may be utilized independently and separately from other components described herein. Each rotor assembly component can also be used in combination with other rotor assembly components. For example, although the present invention is described herein in connection with blade 52, the present invention is not limited to practice in blade 52, and rather the present invention can be implemented and utilized in connection with many other blade configurations.

While the invention has been described in terms of various specific embodiments, those skilled in the art will recognize that the invention can be practiced with modification within the spirit and scope of the claims.

What is claimed is:

1. A method for fabricating a rotor assembly for a gas turbine engine, said method comprising:

providing a plurality of rotor blades that each include an airfoil, a dovetail, a shank, and a platform, wherein the platform extends between the shank and the airfoil, and wherein the dovetail extends outwardly from the shank, and wherein the shank includes a pair of opposed sidewalls connected together by an upstream rotor blade sidewall and a downstream rotor blade sidewall; and forming a cooling circuit within a portion of the shank to supply cooling air to the rotor blade for supplying cooling air to the rotor blade through a first opening for impingement cooling a portion of the rotor blade and for supplying cooling air to the rotor blade through a second opening for purging a cavity defined downstream from the rotor blade, wherein the second opening extends through one of the rotor blade downstream sidewall and the rotor blade upstream sidewall.

2. A method in accordance with claim 1 wherein the shank includes a concave sidewall and a convex sidewall, said forming a cooling circuit within a portion of the shank further comprises:

forming the first opening in the shank concave sidewall for supplying impingement cooling air towards a portion of the rotor blade; and forming the second opening in the shank convex sidewall for channeling purge air downstream from the rotor blade.

3. A method in accordance with claim 2 wherein said forming the second opening in the shank convex sidewall further comprises extending the second opening through the rotor blade downstream sidewall such that the second opening is between the rotor blade platform and dovetail.

4. A method in accordance with claim 2 wherein forming the first opening in the shank concave sidewall further comprises forming the first opening in the shank concave sidewall such that air discharged from the first opening is channeled towards the platform for impingement cooling the platform.

5. A method in accordance with claim 1 wherein forming a cooling circuit within a portion of the shank further comprises forming the cooling circuit within the shank to facilitate reducing platform creep during engine operation.

6. A rotor blade for a gas turbine engine, said rotor blade comprising:
 a platform;
 an airfoil extending radially outward from said platform;
 a shank extending radially inward from said platform, said shank comprising a pair of opposed sidewalls coupled together by an upstream sidewall and a downstream sidewall;
 a dovetail extending from said shank; and
 a cooling circuit comprising a plurality of openings extending through a portion of said shank for supplying cooling air for impingement cooling at least a portion of said rotor blade and for channeling purge air downstream from said rotor blade into a cavity defined within the gas turbine engine, one of said plurality of openings extends through one of said shank upstream sidewall and said shank downstream sidewall.

7. A rotor blade in accordance with claim 6 wherein at least one of said plurality of openings extends through at least one of said convex sidewall and said concave sidewall.

8. A rotor blade in accordance with claim 7 wherein said cooling circuit plurality of openings further comprise a first opening and a second opening, said first opening extending through said shank concave sidewall for directing cooling air for impingement cooling of said platform, said second opening extending through said shank convex sidewall for directing cooling flow from said shank cavity downstream from said rotor blade.

9. A rotor blade in accordance with claim 7 wherein said second opening extends between said shank convex sidewall and said rotor blade downstream side.

10. A rotor blade in accordance with claim 9 wherein said second opening extends through said rotor blade downstream side between said platform and said dovetail.

11. A rotor blade in accordance with claim 7 wherein said first opening facilitates reducing an operating temperature of said platform.

12. A rotor blade in accordance with claim 6 wherein said cooling circuit facilitates blade reducing platform creep during engine operation.

13. A gas turbine engine comprising a rotor assembly comprising a plurality of rotor blades coupled to a rotor disk, each of said plurality of rotor blades comprises an airfoil, a dovetail, a shank, and a platform, said platform extending between said shank and said airfoil, said dovetail extending outward from said shank, said shank comprises a pair of opposed sidewalls coupled together by an upstream sidewall and a downstream sidewall, at least one of said plurality of rotor blades further comprises a cooling circuit comprising a plurality of openings extending through said shank for supplying cooling air for impingement cooling a portion of said rotor blade and for supplying purge air downstream from said platform, wherein one of said plurality of openings extends through one of said shank upstream sidewall and said shank downstream sidewall.

14. A gas turbine engine in accordance with claim 13 wherein each said rotor blade comprises a pressure side and a suction side, said shank comprises a convex sidewall and a concave sidewall connected at said upstream sidewall and said downstream sidewall of said rotor blade.

15. A gas turbine engine in accordance with claim 14 further comprising a buffer cavity downstream from said plurality of rotor blades such that each said rotor blade platform defines a portion of the buffer cavity, said cooling circuit plurality of openings comprises a first opening and a second opening, said first opening extends through said shank concave sidewall for directing cooling air for impingement cooling a portion of said platform, said second opening extends through said shank convex sidewall for directing cooling flow from said shank cavity into the buffer cavity.

16. A gas turbine engine in accordance with claim 15 wherein said second opening extends between said shank convex sidewall and said rotor blade downstream sidewall.

17. A gas turbine engine in accordance with claim 16 wherein said second opening extends through said rotor blade downstream sidewall between said platform and said dovetail.

18. A gas turbine engine in accordance with claim 16 wherein said second opening facilitates reducing hot flow-path gas ingestion within the buffer cavity.

19. A gas turbine engine in accordance with claim 15 wherein said first opening facilitates reducing an operating temperature of said rotor blade platform.

20. A gas turbine engine in accordance with claim 15 wherein said rotor blade cooling circuit facilitates reducing platform creep during engine operation.

* * * * *